US008091879B2

(12) United States Patent
Boss

(10) Patent No.: US 8,091,879 B2
(45) Date of Patent: Jan. 10, 2012

(54) DEVICE FOR TRIMMING THE TOP EDGE, BOTTOM EDGE AND OPENING EDGE OF A PRINTED PRODUCT

(75) Inventor: Heinz Boss, Strengelbach (CH)

(73) Assignee: Mueller Martini Holding AG, Hergiswil (CH)

( * ) Notice: Subject to any disclaimer, the term of this patent is extended or adjusted under 35 U.S.C. 154(b) by 0 days.

(21) Appl. No.: 11/059,466

(22) Filed: Feb. 16, 2005

(65) Prior Publication Data

US 2005/0179189 A1 Aug. 18, 2005

(30) Foreign Application Priority Data

Feb. 17, 2004 (EP) .................................... 04405090

(51) Int. Cl.
*B65G 29/00* (2006.01)
*B65G 47/84* (2006.01)
*B65G 47/86* (2006.01)

(52) U.S. Cl. ............... 270/52.17; 270/52.14; 198/484.1; 198/803.1

(58) Field of Classification Search ............... 270/52.14, 270/52.16, 52.17, 52.19, 52.22; 198/379, 198/470.1, 475.1, 478.1, 484.1, 803.1, 803.13
See application file for complete search history.

(56) References Cited

U.S. PATENT DOCUMENTS

| | | | | | |
|---|---|---|---|---|---|
| 2,245,868 | A | * | 6/1941 | Melby | 83/409.1 |
| 4,038,893 | A | * | 8/1977 | Reist | 83/154 |
| 4,496,140 | A | | 1/1985 | Stobb | |
| 5,110,108 | A | | 5/1992 | Müller | |
| 5,113,731 | A | * | 5/1992 | Reist | 83/35 |
| 5,501,127 | A | * | 3/1996 | Stauber | 83/100 |
| 5,503,051 | A | | 4/1996 | Stauber | |
| 5,715,737 | A | * | 2/1998 | Stauber et al. | 83/154 |
| 5,809,856 | A | * | 9/1998 | Reist et al. | 83/34 |
| 5,826,476 | A | | 10/1998 | Meier | |
| 5,950,511 | A | * | 9/1999 | Luthi | 83/37 |

FOREIGN PATENT DOCUMENTS

| | | |
|---|---|---|
| DE | 112 380 | 4/1975 |
| WO | WO 96/34724 A1 | 11/1996 |

* cited by examiner

*Primary Examiner* — Leslie A Nicholson, III
(74) *Attorney, Agent, or Firm* — Venable LLP; Robert Kinberg; Ryan M. Flandro

(57) ABSTRACT

In a device for trimming the top edge, bottom edge and opening edge of a printed product, for example a newspaper, the printed product is transported through A cutting region of a connected cutting unit in a closed clamp of a synchronously driven conveying apparatus. The conveying apparatus is configured as a conveying rotor and the clamps are guided past a transfer station for loading on a circulating path and past a delivery station for delivering a printed product in an open position. The printed product is trimmed in the cutting region of the cutting unit which is arranged between the transfer station and the delivery station and in which the printed product is clamped in the closed clamp.

2 Claims, 8 Drawing Sheets

DEVICE FOR TRIMMING THE TOP EDGE, BOTTOM EDGE AND OPENING EDGE OF A PRINTED PRODUCT

CROSS-REFERENCE TO RELATED APPLICATION

This application claims the priority of European Application No. 04405090.4-2302 filed on Feb. 17, 2004, the disclosure of which is incorporated herein by reference.

BACKGROUND OF THE INVENTION

The invention relates to a device for trimming the top edge, bottom edge and opening edge of a printed product, such as a newspaper, magazine, brochure or parts thereof, which printed product is transported through a cutting region of a connected cutting unit in a closed clamp of a synchronously driven conveying apparatus.

A device of the abovementioned type is disclosed by Published International Patent Application No. WO 96/34724. The clamps, which are fastened to circulating drawing means, can only be held with great complexity in a stable cutting position for precise trimming of the printed products, and a relatively large amount of space is required for installing the known device.

SUMMARY OF THE INVENTION

It is an object of the present invention to provide an economic mechanism to precisely trim printed products at the top edge, bottom edge and opening edge.

The above and other objects are accomplished according to the invention, by the provision of a conveying device for being coupled with a cutting unit having a cutting region for trimming a top edge, bottom edge and opening edge of a printed product, such as a newspaper, magazine, brochure or parts thereof, the conveying device comprising: a conveying rotor for being synchronously driven with the cutting unit for transporting the printed product through the cutting region of the cutting unit, the conveying rotor having outwardly protruding clamps for being guided on a circulating path sequentially past a transfer station for being loaded with the printed product, past the cutting region of the cutting unit and past a delivery station for delivering the printed product in an open position, the conveying rotor being operable for closing the clamps and clamping in the printed product when the printed product is moved in a controlled manner into the cutting region of the cutting unit for trimming.

Thus, according to the invention, the conveying apparatus is configured as a conveying rotor having outwardly protruding clamps which are guided past on a circulating path a transfer station for loading and past a delivery station for delivering a printed product in an open position, and are guided past in the cutting region of a cutting unit which is arranged between the transfer station and the delivery station and in which the printed product is clamped in the closed clamp and can be moved in a controlled manner into a cutting position for trimming. As a result, it is possible to achieve high product output reliably.

In an advantageous embodiment, the conveying rotor has at least one rotor disc which is mounted on a bearing block which is connected fixedly to the frame and forms a horizontal rotational axis, on the circumference of which rotor disc the clamps are fastened about pivot axes which are arranged parallel to the rotational axis of the conveying rotor.

In order to change the distance between two clamp parts which belong to a clamp, the rotor disc is advantageously formed from two disc plates which lie at least approximately on one another and which can be placed fixedly or so as to rotate with respect to one another about the rotational axis on the bearing block, on which disc plates in each case one clamp part which belongs to a clamp is mounted so as to be pivotable about a pivot axis, with the result that the clamps can be adjusted according to the thickness of the printed products.

The pivot axes of the clamp parts of a clamp are expediently at the same radial distance from the rotational axis, so that simple part manufacture can result.

The clamp parts preferably have a clamping plate which permits clamping of the printed products which is effective over the whole area.

In order to actuate the clamps, the clamp parts of a clamp advantageously each have a control lever which is connected to a control path, with the result that a simple control operation can be effected.

It follows from this that the first clamp part which trails in the circulating direction of the clamps can preferably be actuated by the first control lever which is guided in a first endless control path, for which reason exact actuation of the first clamp part is ensured.

The second clamp part which leads in the circulating direction of the clamps can likewise be actuated by the second control lever which is guided on a second control path, in order for it to be possible to clamp the printed products reliably.

In this way, at least in the cutting region of a cutting unit, the clamping plate of the second clamp part can be pressed against the clamping plate of the first clamp part by the force of a spring, that is to say any deviations present in the thickness of the printed products can be compensated for as a result, for example in the event of selective insertion.

Secondly, the second clamp part can be pressed against the second control path by the force of the spring, with the result that the second clamp part can be controlled with regard to its position for the transfer and removal of the printed products.

It is significant in a device having a cutting unit which is formed by a stationary cutting blade and at least one opposing blade which interacts with the cutting blade on a circular cutting path and is fastened to a circulating drum if, in the cutting region of a cutting unit, the clamping plates of the clamp parts which belong to a clamp, or the printed products, have a position which is approximately perpendicular with respect to a tangent applied to the cutting path, with the result that an approximately planar cutting edge can be produced.

In order that the printed products are supported so as not to move during cutting in the region and behind the cutting edge, it is advantageous if there is a distance between the cutting path and the outer edge of the clamping plate of the second clamp part of a clamp, with the result that the opposing blade of the cutting unit forms a supporting apparatus for the printed product which is in contact with the second clamping plate.

For this reason, the outer edge of the clamping plate of the first (trailing) clamp part can be configured so as to be offset backwards inwardly or in relation to the rotational axis of the conveying rotor, with respect to the outer edge of the clamping plate of the second (leading) clamp part.

In a device having a transporter which feeds the printed products to the conveying rotor or the conveying apparatus in holding clamps which are spaced apart, it is advantageous if, in the transfer region, the transporter or the printed products which are fed suspended and with the binding at the front is/are assigned a supporting drum which guides the printed products on their rear side by means of supporting fingers.

In order to process printed products with relatively great format deviations, it is possible to configure the conveying apparatus using two conveying rotors which can be adjusted axially and fixed in position on a common rotational axis, so that unrestricted production with regard to the format size of the printed products can result.

For this purpose, it is favourable if the conveying rotors are arranged on the rotational axis in a mirror-symmetrical manner opposite one another.

BRIEF DESCRIPTION OF THE DRAWINGS

In the following text, the invention will be explained using an exemplary embodiment and with reference to the drawing, to which reference is expressly made with regard to all the details which are not mentioned in greater detail in the description.

DETAILED DESCRIPTION OF THE INVENTION

Figure 1:
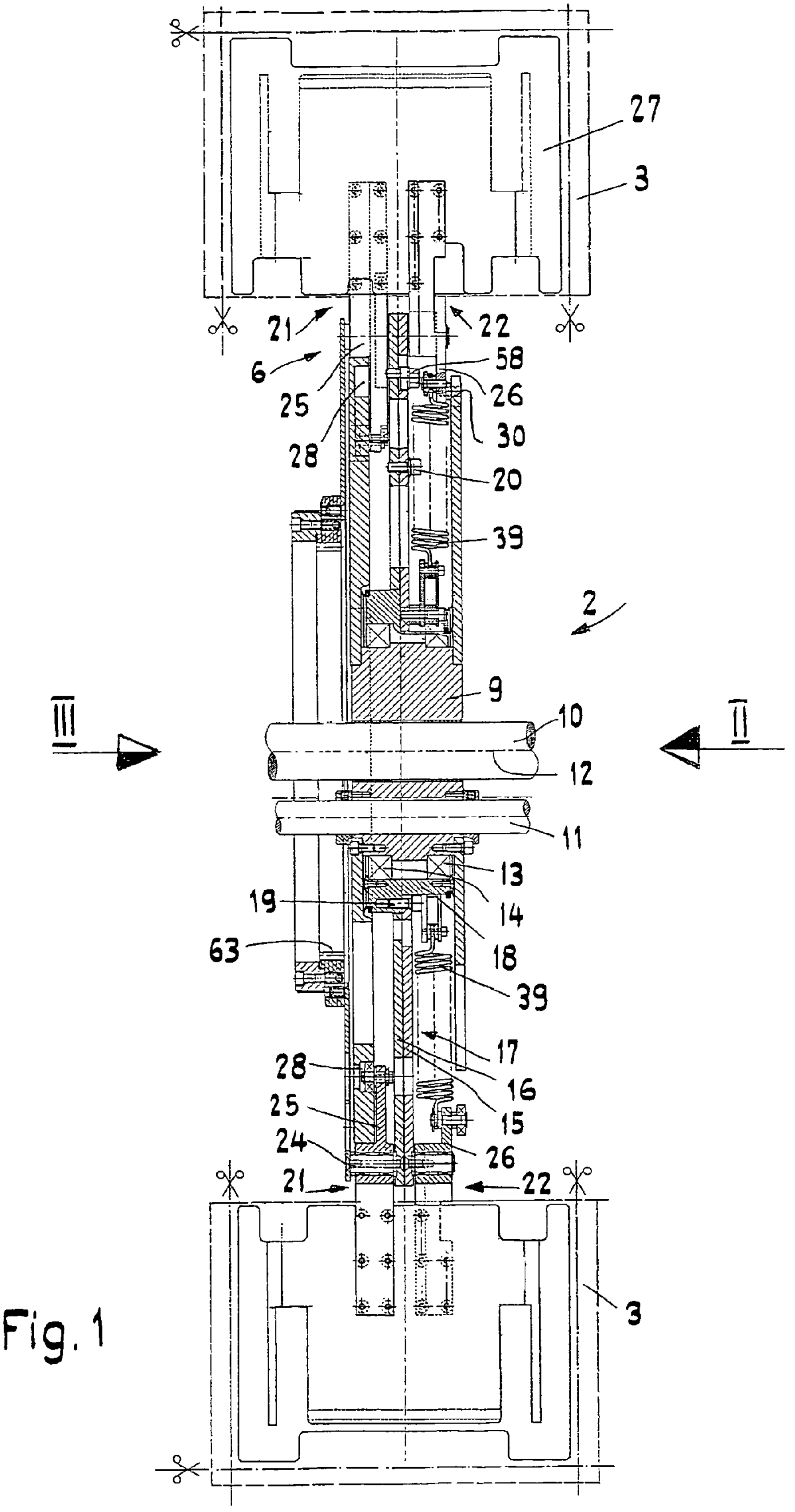
FIG. 1 shows a cross section through a conveying apparatus of a device according to the invention according to the section I-I in FIG. 2.
Figure 4:
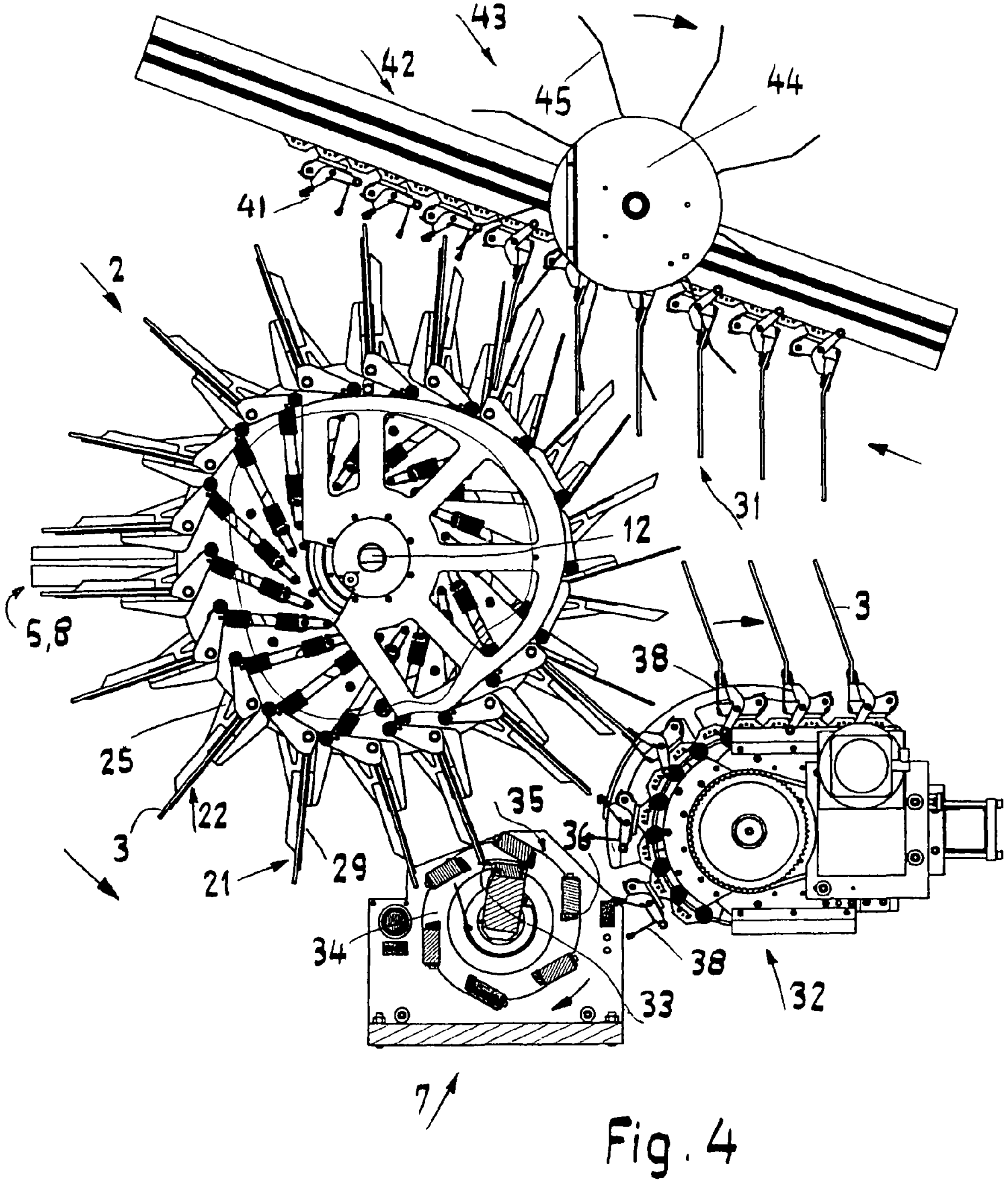
FIG. 4 shows a side view of a device according to the invention.

FIG. 1 illustrates a conveying device 2 of a device 1 shown in FIG. 4 for trimming the top edge, bottom edge and opening edge of a printed product 3, for example a newspaper, book, magazine, brochure or parts thereof.

Figure 5:
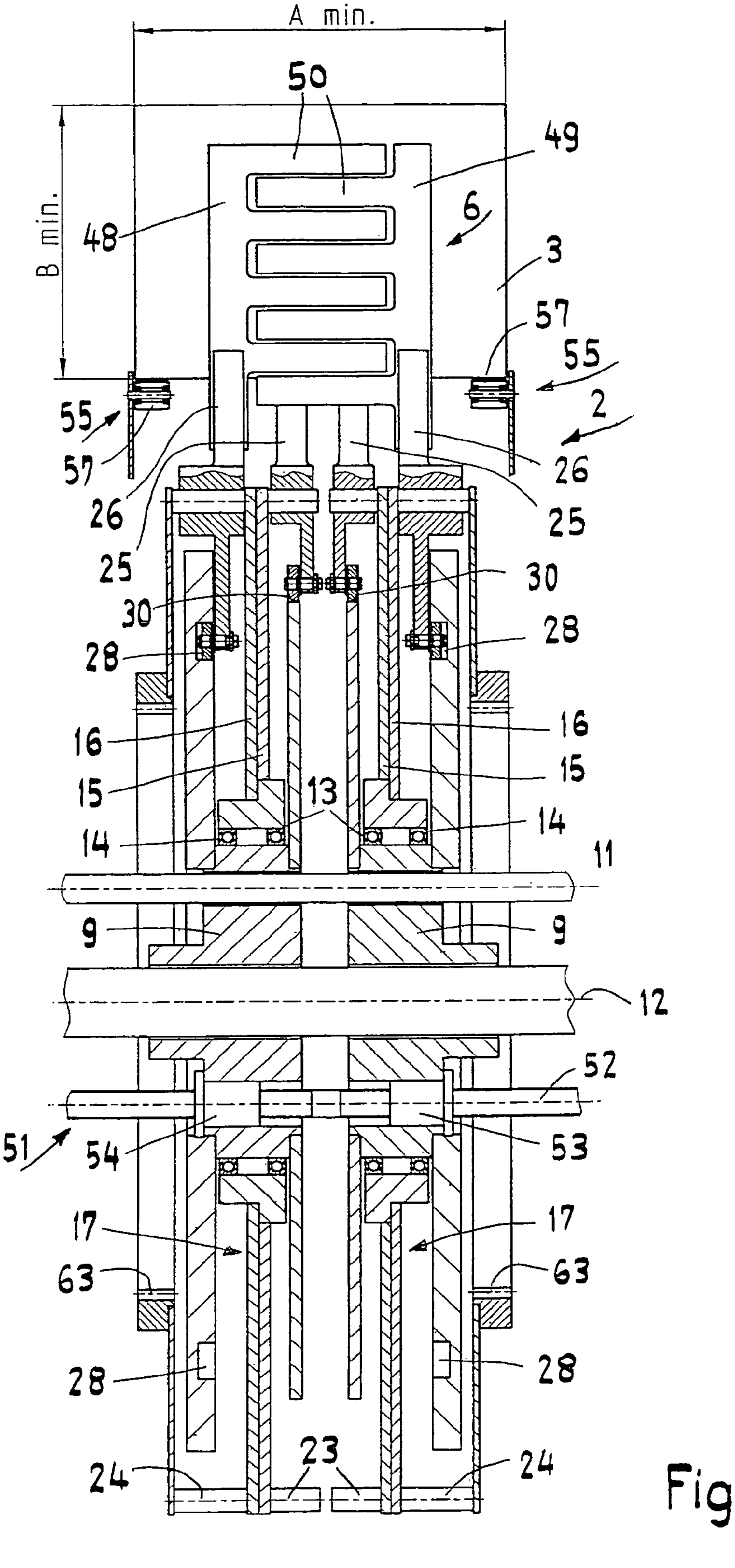
FIG. 5 shows a cross section through an alternative conveying apparatus of a device according to the invention.
Figure 6:
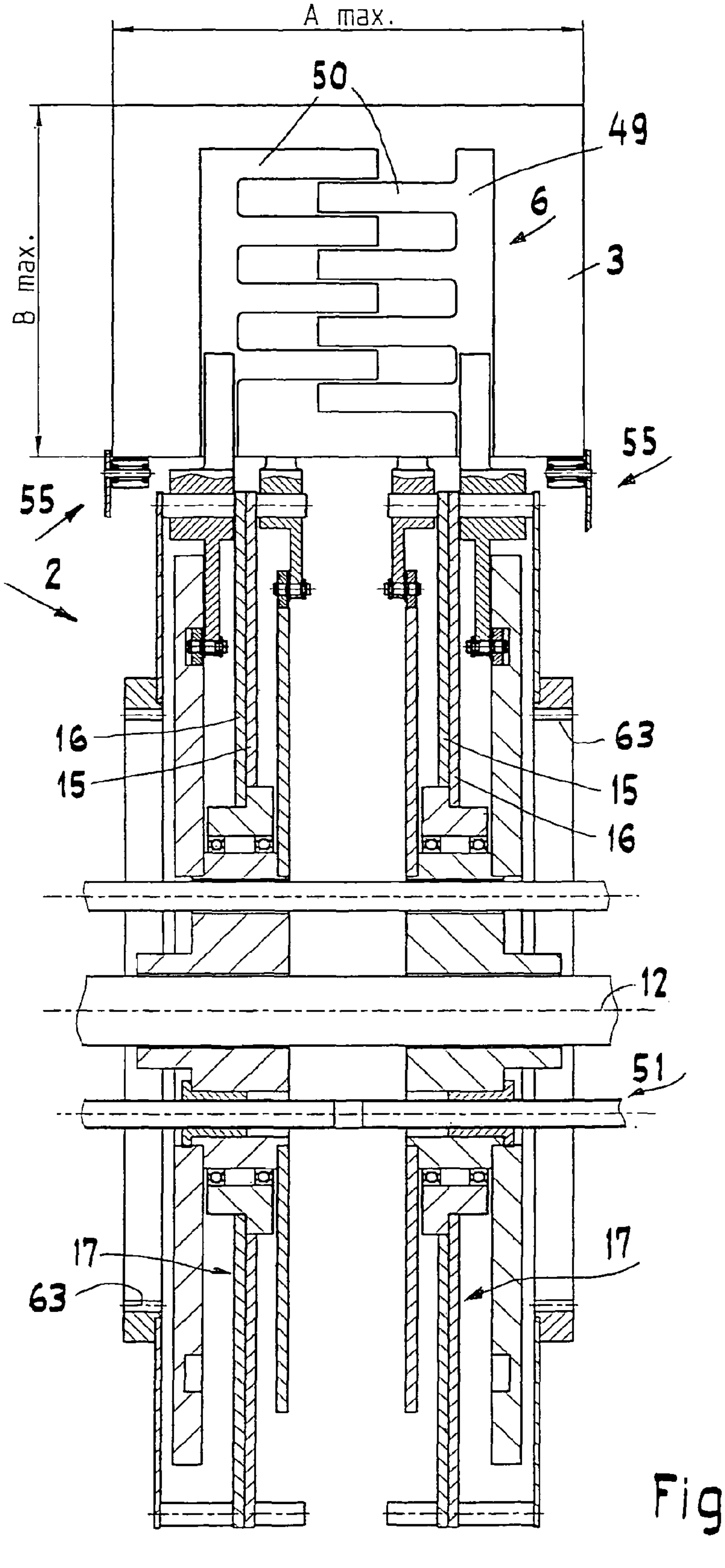
FIG. 6 shows a cross section through the conveying device shown in FIG. 5.

The latter are fed to the conveying apparatus 2 by a transporter 42 or the like. The conveying apparatus which is driven synchronously with the fed printed products 3 is configured as a conveying rotor 2 and is connected ahead of a synchronously operating cutting unit 5 which is described later. The conveying rotor 2 comprises a multiplicity of clamps 6 which are distributed on the circumference about a rotational axis and are guided on their circulating path past a transfer station for loading and past a delivery station for delivering a printed product 3 in the open position. A cutting unit 5, 8 for trimming the top edge and bottom edge, respectively, of a printed product 3 and a cutting unit 7 for trimming the end edge or opening edge of the printed product 3 are situated on the circulating path of the clamps 6 in this order with respect to the rotational direction (cf. FIG. 4) on the path between the transfer station and the delivery station. It goes without saying that it would also be possible for the opening-side trimming of a printed product 3 to be performed before the top-edge and bottom-edge trimming in an appropriate arrangement of the cutting units 7, 5, 8, it being necessary in every case to arrange in each case one cutting unit 5, 8 for trimming the top edge and the bottom edge, respectively. The conveying rotor 2 is mounted on a bearing block 9 which is connected to a machine frame (in a manner which is not visible in the drawing). The embodiment according to FIG. 1 has an axle 10 which forms the rotational axis 12 of the conveying rotor 2 and is connected to the machine frame in a manner which penetrates the bearing block 9. A rod 11 extends through the bearing block 9 parallel to the axle 10, which rod 11 ensures that the bearing block 9, which is pushed onto the axle 10 with a sliding fit, cannot rotate. Adjusting rings are attached to the rod 11 on both sides of the bearing block 9, in order to lock the bearing block 9 in the direction of the extent of the rotational axis 12. Both the axle 10 and the rod 11 are not necessarily required for the refinement of the conveying rotor 2 shown in FIG. 1, as the refinement is provided for trimming printed products 3 of a defined format range, for example for the Berlin format of 320×235 mm. For larger formats for the printed products 3, for example the Rhine format 360×265 mm or the Nordic format 400×295 mm, a larger gripping width is required for the clamps 6, for which a refinement which is still to be described and is shown in FIGS. 5 and 6 is provided.

A rotor disc 17 which is formed from two disc plates 15, 16 which are in contact with one another laterally is mounted on roller bearings 13, 14 on the bearing block 9, to the circumference of which rotor disc 17 the clamps 6 are fastened at regular intervals, one disc plate 15 being fastened by screws 19 to a wheel hub 18 and the other disc plate 16 being rotatably fastened by screws 20 to the disc plate 15. The ability of the disc plates 15, 16 to rotate with respect to one another is achieved by slots in the disc plate 15 which are assigned to the screws 20 and are made, for example, according to arc sections. The adjustment is made, for example, via an eccentric.

The clamps 6, which comprise two clamp parts 21, are each assigned to a disc plate 15, 16 and are mounted on the circumference of the latter about a pivot axis 23 which is arranged parallel to the rotational axis 12 of the conveying rotor 2. For this purpose, a bearing journal 24 is provided for the disc plates 15 and 16, respectively, which bearing journal 24 is connected fixedly or releasably to a disc plate 15, 16. Seated on the bearing journals 24 which form pivot axes 23 are a first control lever 25 and a second control lever 26, respectively, which are assigned to one clamp part 21, 22 of a clamp 6 and can be moved into a pivoting movement.

The drive of the conveying rotor 2 is transmitted, for example, by a driven pinion (not shown) to a crown gear 63 which is fastened on the conveying rotor 2 concentrically with respect to the rotational axis 12 and has internal toothing.

The first control lever 25 which belongs to the clamp part 21 is fastened to a first clamping plate 27 and is guided in a first control path 28 by its free lever end to which a freely rotatable roller 59 is fastened.

The clamp part 22 has a second clamping plate 29 to which the second control lever 26 is fastened, the free end of which is connected to a freely rotatable roller 40 that is guided on a second control path 30.

As seen in the rotational direction, the clamp part 22 of a clamp 6 leads the clamp part 21, and the trailing clamp part 21 has a clamping plate 27 whose outer end is situated within the outer edge of the clamping plate 29 of the clamp part 22 when the clamp 6 is closed.

Figure 2:
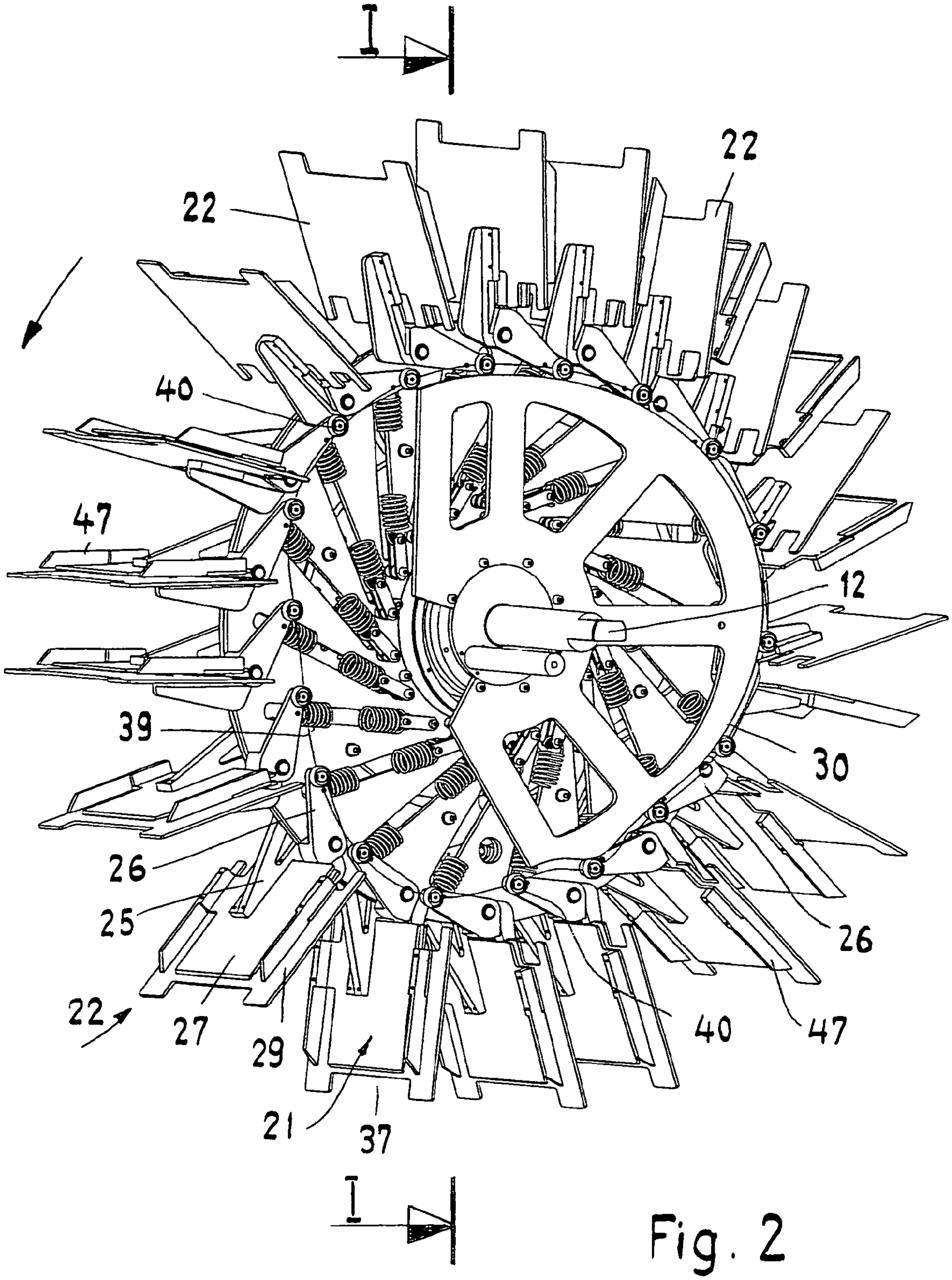
FIG. 2 shows a three-dimensional side view in the arrow direction II of the conveying apparatus shown in FIG. 1.

FIG. 4 shows the conveying rotor 2 in interaction with a feed device 31 for the printed products 3 above the conveying rotor 2, a cutting unit 5, 8 for trimming the top edges and bottom edges of the printed products 3, a cutting unit 7 which adjoins in the conveying direction for trimming the opening edge or front edge of a printed product 3, and a following removal apparatus 32. The reason why the outer edge of the clamping plate 27 of the trailing clamp part 21 of a clamp 6 is offset backwards is the configuration of the cutting unit 7 for trimming the opening edge of a printed product 3. European Patent Application 03405709.1 describes the cutting unit 7 as a device for trimming a printed product, in which the printed product is fed, with a lateral edge to be trimmed at the front, by the cutting unit 7 which is formed by a stationary cutting blade 33 and a plurality of opposing blades 36 which interact with the cutting blade 33 on a circular cutting path 34 and are fastened to a circulating drum 35. While it passes the stationary cutting blade 33, the end to be trimmed of the printed product 3 is situated between the leading clamping plate 29 and an opposing blade 36 which supports the printed product 3 for cutting and interacts with the stationary cutting blade 33. The cutting units 5, 8 are of the same construction as provided in the case of the cutting unit 7. Furthermore, the clamping plate 29 of the leading clamp part 22 has an approximately rectangular cut-out 37 (FIG. 2) at its outermost end, which cut-out 37 is provided to grip the trimmed printed products 3 with the controlled grippers 38 of the removal apparatus 32 and serves to transfer or feed the printed products 3 to the clamps 6 at the transfer station 31 in a gentle manner. The removal apparatus 32 is a wheel which is driven in the arrow direction E and to whose circumference grippers 38 are fastened which can be actuated into an open or closed position. When printed products 3 dip into the open grippers 38, grippers 38 perform a closing movement to grip the printed products and transport them for further processing.

According to FIG. 4, the transfer station 31 is arranged at approximately a 1 o'clock position, the cutting units 5, 8 for top-edge and bottom-edge trimming are arranged at approximately a 9 o'clock position, the cutting unit 7 for the opening edge is arranged at approximately a 5 o'clock position and the delivery station or the removal apparatus 32 is arranged approximately at a 4 o'clock position. It is not necessarily required to adhere to this arrangement.

The individual processing steps take place at the above-mentioned positions over a defined rotary angle region of the conveying rotor 2. The rotary angle regions at which the clamps 6 or the clamp parts 21, 22 are actuated are assigned the first and the second control path 28, 30 or control-path sections. The control lever 26 which is articulated on the disc plate 16 engages into the first endless control path 28 and moves the trailing clamp part 21 on the circulating path into a position which corresponds to the other clamp part 22 and into which the clamp part 22 is moved by the second control path 30 so that, on their circulating path in the rotational direction, the clamps 6 are open before the transfer position, approximately closed thereafter and clamp a printed product 3 over as much of their areas as possible between the clamp parts 21, 22 or the clamping plates 27, 29 before the trimming of the top edge, bottom edge and opening edge of the printed product 3. That is to say, the printed products remain clamped at the opening edge on the section between top-edge/bottom-edge trimming and front-edge trimming. On the further path to the delivery station, the clamps 6 open, with the result that the removal apparatus 32 can lift the printed product 3 which has been trimmed at three edges out of the clamps 6. As FIG. 4 shows, the clamps 6 are initially not closed completely on the section between the transfer station and the cutting unit 5, 8 for top-edge and bottom-edge trimming, with the result that the position of the printed products 3 can be oriented exactly.

It is additionaly possible to perform top-edge trimming and bottom-edge trimming one after the other on the circulating path. For top-edge and bottom-edge trimming of the printed products 3, the cutting units 5 and 8 which are arranged on both sides of the conveying rotor 2 are fastened so as to lie opposite one another along the circulating path of the clamps 6. The clamp parts 21 which trail on the circulating path are positively guided by the control levers 25 in the first control path 28 of slotted-guide design, whereas the clamp parts 22 are guided by levers 26 which are pressed against the second control path 30 by means of tension springs 39. The control path 30 is provided for the opening movement of a clamp part 22 and extends about the rotational axis 12 of the conveying rotor 2 in an angular region where the printed products 3 are lifted loosely in the clamps 6. In the present example, the angular region is approximately 180°. As soon as the guide roller 40 of the lever 26 leaves the second control path 30, before the cutting region of the cutting units 5, 8 and 7 begins, the torsion spring 39 presses the leading clamping plate 29 against the clamping plate 27 which is guided in the control path 28, with the interposition of a printed product 3, with the result that the printed product 3 is clamped in the clamp 6.

When the clamp 6 reaches the cutting region of a cutting unit 5, 8 or 7, it is guided by the control path 28 and the control lever 25 of the clamp part 21 so that, in an adjacent cutting unit 5, 8 or 7 which is formed by a stationary cutting blade 33 and a plurality of opposing blades 36 which interact with the cutting blade 33 on a circular cutting path and are fastened to a circulating drum 35, the clamping plates 27, 29 of the clamp parts 21, 22 which belong to a clamp 6 have a position which is approximately perpendicular with respect to a tangent applied to the cutting path, over the cutting region of a cutting unit 5, 8 or 7.

Deviations with regard to the thickness of the printed products 3 are compensated for by the torsion spring 39 which acts on the lever 25.

If the thickness of the printed products 3 changes generally as the result of a new processing job, the clamps 6 are adapted to the change in thickness, in that the disc plates 15, 16 which form the rotor disc 17 are displaced or adjusted by being rotated with respect to one another or by rotating the disc plate 16 with respect to the disc plate 15, with the result that the entire surface areas of the clamping plates 27, 29 are pressed against one another when a printed product 3 is clamped in them. The clamp position is changed by releasing the screws 20 which are anchored in the disc plate 16 and penetrate an arcuate slot in the disc plate 15. After the disc plate 15 has been rotated by the amount of the change in thickness, the screws are tightened again. It goes without saying that the adjustment of the clamps 6 could also be performed by motor using appropriate measures.

As FIG. 4 shows, the printed products 3 are fed at regular intervals in clamps 41 of a transporter 42 to the conveying rotor 2, the printed products 3 being clamped in the holding clamps 41 at the open side or at the bloom and hanging downwards. In order to be transferred to the conveying rotor 2, the printed products 3 are threaded in between two clamping plates 27, 29 of an open clamp 6 and preferably held in the holding clamps 41 of the transporter 42 until they arrive at a positioning apparatus 55. Afterwards, the clamps 6 remain open to such an extent that the printed products 3 can be placed accurately with regard to the trimming of their top edge and bottom edge.

As the printed products 3 in the conveying rotor 2 on the circulating path which touches the cutting circle are moving at the same speed as the cutting units 5, 8, 7 on the cutting circle, the clamp spacings and the spacings between the rotating opposing blades 36 are also equally large. The same is true for the grippers 38 of the removal apparatus 32.

In this connection, it should be noted that, in the exemplary embodiment illustrated in FIG. 4, the conveying apparatus 2 which is configured as a conveying rotor is connected behind transporter 42 in a synchronous manner and the conveying rotor 2 is followed by a removal apparatus 32 which is connected so as to have a conveying action.

Figure 3:
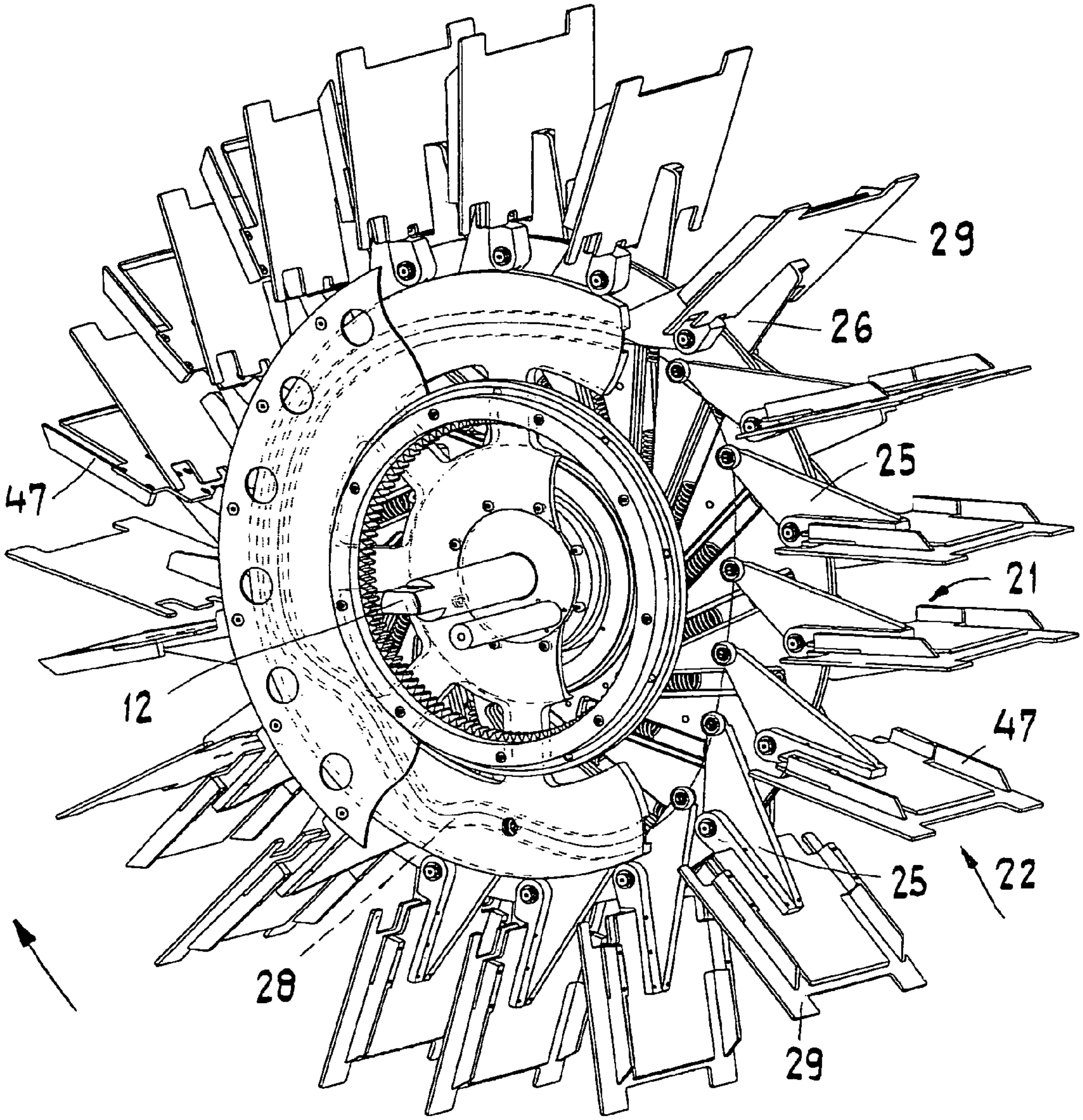
FIG. 3 shows a three-dimensional side view in the arrow direction III of the conveying apparatus shown in FIG. 1, or the rear side of the conveying apparatus illustrated in FIG. 2.
Figure 7:
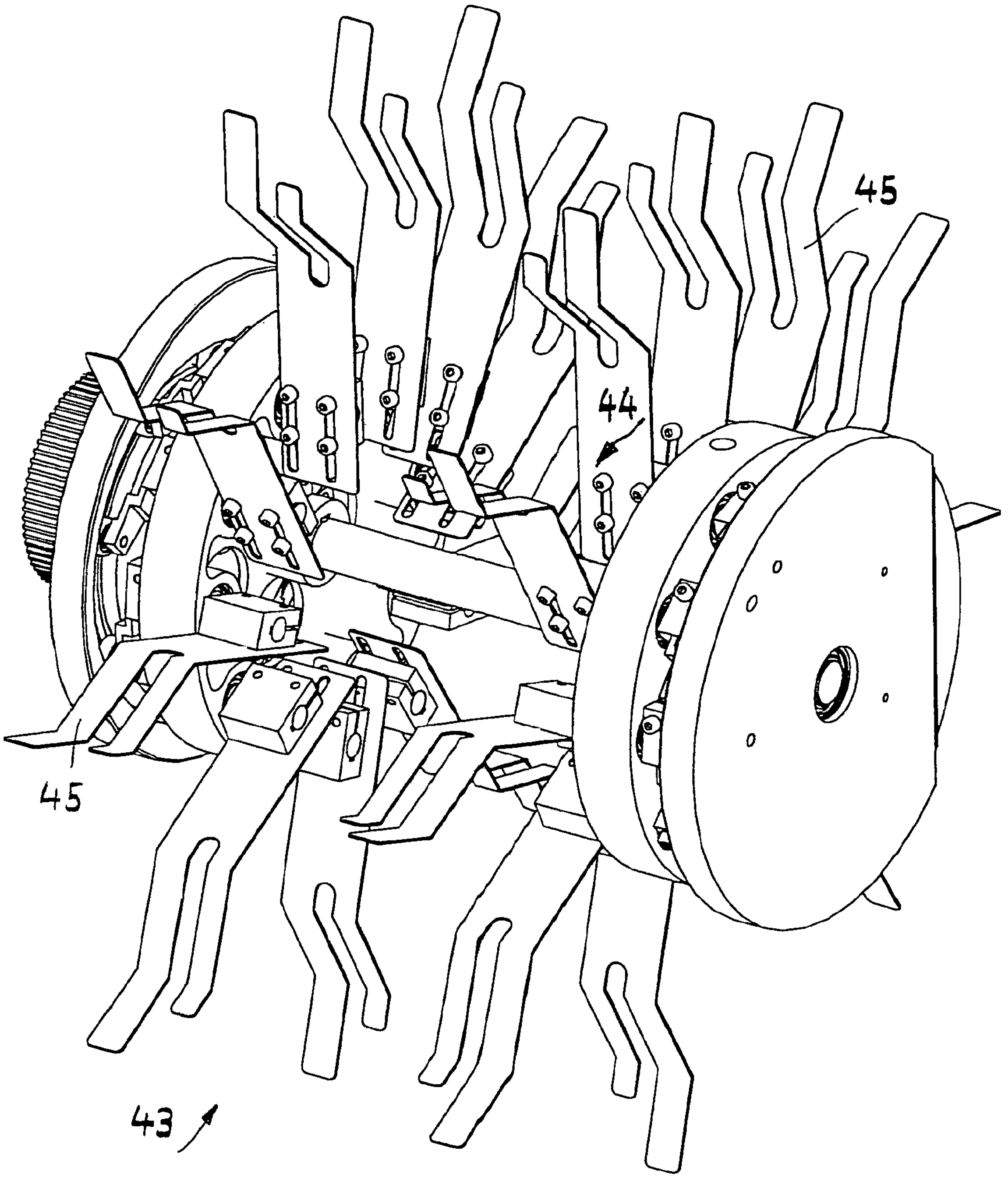
FIG. 7 shows a three-dimensional illustration of a supporting apparatus for fed printed products.

In order to assist the loading of the clamps, it is possible, as illustrated in FIG. 4, to use an auxiliary guide which acts on the printed products 3 suspended on the holding clamps 41 of the transporter 42 in the form of a synchronous rotating supporting drum 43. The supporting drum 43 (cf. FIG. 7) has fingers 45 on its circumference which protrude from a rotor 44, have an angled-away free end and accompany the printed product 3 entering the transfer region with a supportive action on its rear side. For this purpose, the fingers 45 are controlled with respect to their position, that is to say they penetrate the circulating path of the clamping plates 27 and emerge from the latter as soon as the printed product 3 has been detached from the clamp 41 of the transporter 42 and is in the clamp 6 of the conveying rotor 2. Two supporting fingers 45 are provided in each case for the favourable support of the printed products 3 on the supporting drum 43. In addition, the supporting fingers 45 have longitudinally extending slots 46 in order for it to be possible for supporting strips 47 (See FIGS. 2 and 3) on the clamping plate 27 of the clamp part 21 to pass through. The abovementioned supporting strips 47 widen the contact area of the printed products 3 on the clamping plate 27 of the clamp parts 21 of a clamp 6.

In the arrangement of the device 1 according to FIG. 4, a transporter 42 for feeding the printed products 3 is provided with holding clamps 41 which are moved at regular intervals, adjacent to and above the conveying rotor 2. The transporter 42 has a defined oblique position in which the printed products 3 reach and pass through the transfer station or the transfer region on an uphill section. As a result of the oblique position, which is not necessarily required, a conveying section can be provided on the circulating path of the clamps 6 of the conveying rotor 2 from the transfer station to the cutting units 5, 8, in which conveying section the printed products 3 in the clamps 6 can be oriented and checked with regard to their lateral position prior to top-edge and bottom-edge trimming. It goes without saying that the feed section of the transporter 42 could also be oriented horizontally, as a result of which, however, a shorter orientation section would be produced or less orientation time would be available in the case of an identical arrangement of the cutting units 5, 8.

FIGS. 5 and 6 show an embodiment of a conveying apparatus 2 which is illustrated in simplified form and with which it is possible to process printed products having large format differences.

For this purpose, two conveying rotors (shown in FIGS. 1 to 4) are provided which can be adjusted axially and fixed in position on a common rotational axis 12. They are arranged in a mirror-symmetrical manner. A noticeable difference is formed by the clamps 6 or their clamp parts 21, 22 which each have two-part clamping plates 27, 29. FIG. 5 illustrates the conveying apparatus 2 in a position in which printed products 3 with minimum dimensions can be gripped or clamped in a clamp 6 and the conveying rotors are set to the smallest axial spacing. In contrast, FIG. 6 shows the conveying apparatus 2 with a larger spacing between the conveying rotors, with the result that maximum printed-sheet formats can be clamped in the clamps 6.

In order that both the smallest formats and the largest formats for the printed products 3 are in sufficient contact with the clamping plates 27, 29, in order to be clamped in optimum fashion, the two-part clamping plates 27, 29 are formed by plate elements 48, 49 which slide into one another and have finger-like projections 50 offset at intervals. In each case two control levers 25 or 26 of a clamp 6 of two conveyor rotors are connected, so that they can be actuated, to in each case two clamping plates 27, 29 formed by plate elements 48, 49.

The rotor discs 17 are adjusted on the common rotational axis 12 by means of a spindle drive 51. A drivable spindle 52 passes through the bearing blocks 9 in which in each case a nut 53, 54 with a right-hand and left-hand thread, respectively, is fastened so as to match the spindle thread.

Figure 8:
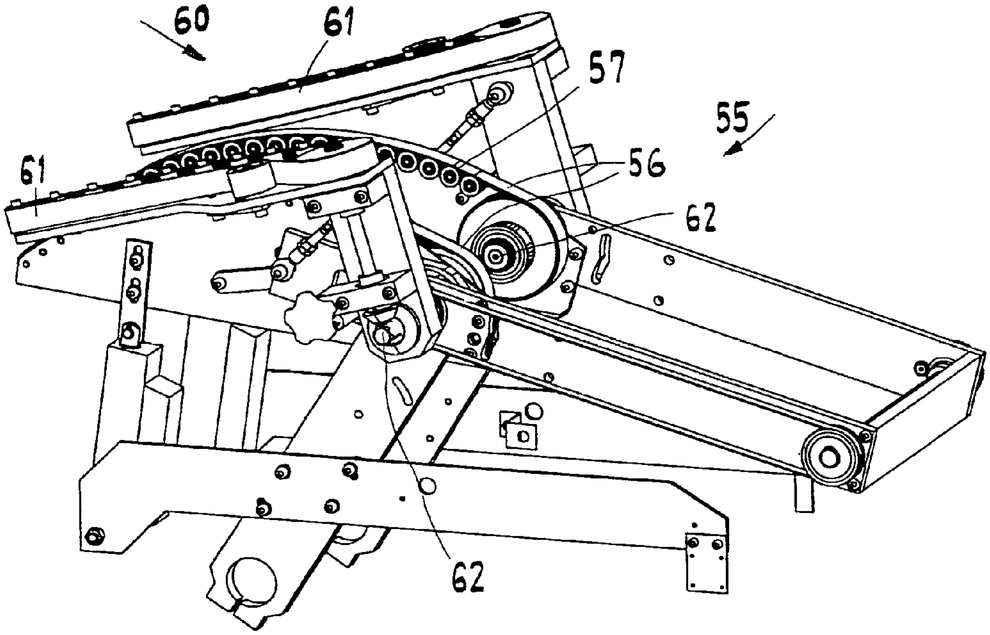
FIG. 8 shows a three-dimensional illustration of a positioning apparatus.

In order to transfer the printed products 3 to the clamps 6 of the conveying apparatus 2, the printed products 3, which are conveyed in a suspended manner by the transporter 42, are deposited with their spines on a positioning apparatus 55 and from there the printed products are fed to the open clamps. The positioning apparatus is shown in FIG. 8 and extends in the counter-clockwise direction from approximately 1 o'clock to 11 o'clock on account of the arrangement between the transporter 42 and the conveyor rotor 2. As soon as the final processing position has been reached in the clamps 6, the latter are closed by the control path 28 and the force of the spring 39 and subsequently pass through the cutting units 5, 7, 8. The positioning apparatus 55, which is clamped fixedly in the rotational axis 12, has, on the transfer path of the printed products 3, two endless belts 56 which are spaced apart laterally from one another, are driven in the same direction at approximately the speed of the conveyor apparatus 2 and are in contact with a plurality of rollers 57 which are arranged one behind the other. The positioning apparatus 55 is configured so as to be adjustable to the format of a printed product 3 to be trimmed.

Before the clamps 6 close, an adjustable centering apparatus 60 ensures the correct lateral position of the printed products 3 by means of belts 61 which run concurrently on the sides.

The invention has been described in detail with respect to referred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A conveying device for interaction with a cutting unit having a cutting region for trimming one of a top edge, bottom edge and opening edge of a printed product, the conveying device comprising:

a conveying rotor for being synchronously driven with the cutting unit for transporting the printed product through the cutting region of the cutting unit, the conveying rotor having outwardly protruding clamps for being guided on a circulating path sequentially past a transfer station for being loaded with the printed product, past the cutting region of the cutting unit and past a delivery station for delivering the printed product in an open position, the conveying rotor being operable for closing the clamps and clamping in the printed product when the printed product is moved in a controlled manner into the cutting region of the cutting unit for trimming, wherein the conveying rotor includes:

a bearing block adapted to be fixedly connected to a machine frame; and at least one rotor disc mounted on the bearing block and arranged to rotate about a rotational axis, wherein each clamp is fastened on a circumference of the at least one rotor disc to be pivotable about pivot axes arranged parallel to the rotational axis of the rotor disc, and wherein an outermost edge of each clamp is constructed to be at a distance from a cutting path of the cutting unit during trimming of the printed product, wherein each clamp comprises first and second clamp parts, wherein the first clamp part trails the second clamp part in a circulating direction of the conveying rotor, and wherein an outer edge of the first clamp part is offset inwardly with respect to an outer edge of the clamping plate of the second clamp part.

2. The device according to claim 1, wherein, as the rotor disc rotates about the rotational axis, each clamp is guided on and transitions from a first circular control path to a second control path in which each print product is clamped and maintained approximately perpendicular to a tangent to the cutting path through the cutting region of the cutting unit.

* * * * *